US010106948B2

(12) United States Patent
Fathi

(10) Patent No.: US 10,106,948 B2
(45) Date of Patent: Oct. 23, 2018

(54) SYSTEM AND METHOD FOR IMPROVING DEFORMABILITY OF BURIED PIPELINES

(71) Applicant: Alfa Upgrades Inc., Calgary (CA)

(72) Inventor: Ali Fathi, Calgary (CA)

(73) Assignee: ALFA UPGRADES INC., Calgary (CA)

( * ) Notice: Subject to any disclaimer, the term of this patent is extended or adjusted under 35 U.S.C. 154(b) by 0 days.

(21) Appl. No.: 15/505,683

(22) PCT Filed: Aug. 27, 2015

(86) PCT No.: PCT/CA2015/050825
§ 371 (c)(1),
(2) Date: Feb. 22, 2017

(87) PCT Pub. No.: WO2016/029318
PCT Pub. Date: Mar. 3, 2016

(65) Prior Publication Data
US 2017/0247852 A1    Aug. 31, 2017

Related U.S. Application Data

(60) Provisional application No. 62/042,314, filed on Aug. 27, 2014.

(51) Int. Cl.
*E02D 31/14* (2006.01)
*F16L 1/11* (2006.01)
(Continued)

(52) U.S. Cl.
CPC ............... *E02D 31/14* (2013.01); *E03F 3/06* (2013.01); *F16L 1/11* (2013.01); *F16L 3/26* (2013.01);
(Continued)

(58) Field of Classification Search
CPC ......... E02D 31/14; E02D 27/46; E02D 31/10; E02D 31/12; E03F 3/06; F16L 1/11;
(Continued)

(56) References Cited

U.S. PATENT DOCUMENTS 3,675,432 A * 7/1972 Keene .................. F16L 59/12
138/105
3,952,529 A    4/1976 Lefever
(Continued)

FOREIGN PATENT DOCUMENTS

| CN | 102943945 A | 2/2013 |
| JP | 10205651 A | 8/1998 |

(Continued)

OTHER PUBLICATIONS

Byrne, William; International Search Report and Written Opinion of the International Searching Authority, issued in International Application No. PCT/CA2015/050825; dated Nov. 5, 2015; 11 pages.

*Primary Examiner* — Benjamin F Fiorello
(74) *Attorney, Agent, or Firm* — Ulmer & Berne LLP

(57) ABSTRACT

A system is provided that increases the deformability of buried pipelines to accommodate combinations of vertical, lateral and longitudinal displacements and subsequent curvatures caused by ground movements. Installation of this system prevents concentration of deformations which may cause catastrophic failures such as buckling, yielding, rupture, and weld failures. The assembly includes an element provided adjacent a pipeline and collapsible in two orthogonal directions; one, the longitudinal direction of the pipe, and two, a direction of expected lateral movement of the pipe. The collapsible element is configured to resist soil pressure in a direction orthogonal to the first two directions, and further provided is a supporting backing element adjacent an end of the collapsible element opposed to the pipeline, to prevent exposure of the collapsible element to (Continued)

soil pressure in one of the two orthogonal collapsible directions. The size and configuration of the installation depends on the soil and pipe properties, and type/magnitude of expected displacements.

18 Claims, 7 Drawing Sheets

(51) Int. Cl.
| | |
|---|---|
| E03F 3/06 | (2006.01) |
| F16L 3/26 | (2006.01) |
| F16L 57/02 | (2006.01) |
| E02D 27/46 | (2006.01) |
| E02D 31/10 | (2006.01) |
| E02D 31/12 | (2006.01) |
| F16L 1/024 | (2006.01) |
| F16L 3/015 | (2006.01) |
| F16L 3/16 | (2006.01) |

(52) U.S. Cl.
CPC ............ *E02D 27/46* (2013.01); *E02D 31/10* (2013.01); *E02D 31/12* (2013.01); *F16L 1/024* (2013.01); *F16L 3/015* (2013.01); *F16L 3/16* (2013.01); *F16L 57/02* (2013.01)

(58) Field of Classification Search
CPC ... F16L 1/024; F16L 3/26; F16L 3/015; F16L 3/16; F16L 57/02
See application file for complete search history.

(56) References Cited

U.S. PATENT DOCUMENTS

| | | | | | |
|---|---|---|---|---|---|
| 4,462,715 | A | * | 7/1984 | Ashbaugh | E02F 5/223 405/157 |
| 4,629,364 | A | * | 12/1986 | Sayles | F16L 1/026 138/32 |
| 5,154,543 | A | * | 10/1992 | Houck | E02B 11/00 138/118.1 |
| 5,639,364 | A | * | 6/1997 | Houck | E02B 11/00 210/170.01 |
| 6,315,493 | B2 | * | 11/2001 | Malone | E03F 1/002 210/747.1 |
| 6,976,809 | B1 | * | 12/2005 | Metz | E02D 31/14 138/32 |

FOREIGN PATENT DOCUMENTS

| | | |
|---|---|---|
| RU | 2363876 C1 | 8/2009 |
| RU | 2447348 C2 | 4/2012 |
| RU | 119836 U1 | 8/2012 |

* cited by examiner

SYSTEM AND METHOD FOR IMPROVING DEFORMABILITY OF BURIED PIPELINES

RELATED APPLICATIONS

This application claims the benefit of U.S. Provisional Patent Application No. 62/042,314, filed Aug. 27, 2014, which is hereby incorporated by reference in its entirety.

FIELD OF THE INVENTION

This invention relates to buried pipelines, and more particularly to buried pipelines subject to ground movements caused by geological or environmental phenomena such as fault slips, landslides, slope creep, and permafrost.

BACKGROUND OF THE INVENTION

Pipelines are the most efficient way to transport a variety of products such as water, oil and natural gas. A major and growing concern about pipelines is safety and reliability. Parts of existing and future buried pipelines cross areas prone to ground movements which can pose serious hazards to the pipelines. Ground movements are not frequent, but since a usual pipelines failure due to ground movement is rupture, ground movements are considered a high-risk threat to pipelines with potentially catastrophic failure consequences. The catastrophe is due to the high operation pressures and explosive and contaminating nature of the pipeline contents (e.g. hydrocarbon or $CO^2$ pipelines) or the disruption of critical supply in emergency conditions (e.g. water supply for communities after earthquakes).

Ground movements can occur due to variety of sources such as seismic activities, fault slips, downhill creep, landslides, frost heaves and thaw settlements, etc. Many pipelines cross rough terrains, discontinuous permafrost regions, or areas susceptible to seismic activities or heavy rain falls. Considering the vast spread of such areas around the world through which pipelines cross, pipeline exposure to ground movements is a global concern.

When ground movement displaces part of a pipeline, internal forces and moments develop in a certain length of the pipe. It is not practical to design pipelines with a level of strength to resist ground movements, however, pipelines can be designed with a deformability level to deform in such a way that the development of internal forces (associated with the applied displacements) won't reach critical values. Deformability is the ability of pipelines to distribute applied deformations along their length without approaching critical conditions. In other words, pipelines with higher degrees of deformability have a greater capacity to accommodate displacement due to ground movement without excessive strain concentrations.

Based on the direction of the ground movement and the orientation of the pipe axis, a displacement can have three components (with respect to the pipe axis), namely longitudinal, lateral and vertical. For example, frost heave and thaw settlement result in vertical displacements; downhill creep and landslides more likely impose a combination of longitudinal and lateral displacements; and fault slips can cause combinations of longitudinal, lateral and/or vertical displacements. The critical segment of the pipe can go under axial tension and compression, horizontal and vertical shear forces and/or in-plane and out-of-plane bending moments. The magnitudes of these internal forces and moments have an inverse relation with the pipe's ability to move under the ground and distribute the applied displacements to longer distances.

In the case of buried pipelines, the boundary constraints from the backfill and surrounding soil limit the pipe ability to easily move and deform when it is displaced by ground movements. Axial friction between the pipe and surrounding soil resists longitudinal movement; backfill weight resists upward vertical movement; soil vertical bearing resistance prevents vertical downward movement; and passive soil pressure resists lateral movement of a buried pipeline. Continuous pipelines, such as oil and gas pipelines, show high performance under movements causing axial tensile deformation, but, these pipeline's performance level decreases under movements causing lateral and vertical deformations and the pipeline's performance becomes very limited under axial compression. For segmented pipelines such as water supply pipelines, any types of movement causing tensile, compressive or lateral forces and bending deformations can jeopardize the integrity of the pipeline.

There are few engineering solutions in the prior art to modify the boundary conditions of buried pipelines in order to mitigate the risks caused by ground movements. These solutions include using wide trenches with soft back filling soil, installation of polystyrene beads in geo-textile bags around the pipe, or installation of geo-foam cubes on top of the pipe before backfilling the trench.

These methods try to provide soft boundary constraints that allow buried pipes to move when the pipes are displaced by ground movement. However, boundary elements used in these methods are homogenous and essentially have isotropic mechanical behaviour. Therefore, their softness cannot be less than a certain level; otherwise they will be crushed under the weight of the backfill and overburden weight or the soil lateral active pressure. This shortcoming limits the effectiveness of these methods in terms of how much and what types of pipe deformation they can accommodate. An ideal boundary condition is one that resists the soil pressures and—at the same time—accommodates pipe displacements caused by ground movements. This requires a set of elements with an anisotropic mechanical behaviour which are stiff in the direction along which the soil pressure is applied, and is collapsible in the direction along which the pipe moves.

SUMMARY OF THE INVENTION

The system according to the invention provides a boundary condition that resists soil pressures and at the same time accommodates pipe displacements caused by ground movement. This uses a set of elements with an anisotropic mechanical behaviour which are stiff in the direction along which the soil pressure is applied, and is collapsible in the direction along which the pipe moves.

A system to increase the deformability of a pipe buried in soil is provided including: a first near element positioned close to the pipe, the first near element having first and second opposite load carrying sides; and a first distant element positioned next to the first near element, the first distant element extending past the first and second load carrying opposite sides; wherein the first near element is positioned between the pipe and the first distant element, and the first near element is collapsible in two orthogonal directions such that in a cross-section of the pipe, the pipe is moveable in a direction towards the first near element and the first near element is configured to carry soil pressure perpendicular to the pipe movement direction. The system may include a second near element and a second distant element, wherein the first and second near elements are positioned on opposite sides of the pipe and each of the first and second near elements is protected from the soil pressure by respective first and second distant elements.

The first near element may be oriented vertically and may be collapsible in lateral and longitudinal directions with respect to the pipe axis thereby allowing the pipe to move laterally or longitudinally without developing forces large enough to damage the pipe. The height of the first adjacent element may be at least equal to the pipe diameter. The system may include a plurality of pairs of near elements and distant elements, wherein each pair is positioned along the pipe and alternating between opposing sides of the pipe with an overlap on opposing sides of the pipe. The system may include a plurality of pairs of near elements and distant elements, wherein each pair is positioned along the pipe and alternating between opposing sides of the pipe without an overlap on opposing sides of the pipe.

The first near element may be oriented horizontally and may be collapsible in vertical and longitudinal directions with respect to the pipe axis thereby allowing the pipe to move vertically or longitudinally without developing forces large enough to damage the pipe. The width of the first near element may be at least equal to the pipe diameter. The system may include a plurality of near elements and distant elements positioned on top of the pipe and along the length of the pipe.

The size, material and structure of the first near element and the first distant element may be selected based on soil mechanical properties, characteristics of the pipe and expected type and magnitude of ground movements. The first near element may contain a fluid releasable after the pipe contacts the first near element to facilitate movement of the pipe. A sliding surface with low friction may be positioned between the pipe and the first near element, or may be positioned between the first near element and the first distant element, to facilitate longitudinal sliding of the pipe.

Backfill around the pipe may be configured to provide friction between the pipe and soil to maintain the integrity of the pipe under operating conditions and to facilitate the desired deformation of the pipe under expected ground movement. The first near element and the first distant element may be installable after removal of backfill on the pipe. The soil around the first near element and the first distant element may be reinforced by geotechnical soil reinforcing methods. The dimensions and installation angle of the first near element and first distant element may vary along the pipe.

A method of directing the deformation of a buried pipe in at least two orthogonal directions is provided, including: providing a first near element positioned close to the pipe, the first near element having first and second opposite load carrying sides; and providing a first distant element positioned next to the first near element, the first distant element extending past the first and second load carrying opposite sides; wherein the first near element is positioned between the pipe and the first distant element, and the first near element is collapsible in two orthogonal directions such that in a cross-section of the pipe, the pipe is moveable in a direction towards the first near element and the first near element is configured to carry the soil pressure perpendicular to the pipe movement direction.

DESCRIPTION OF THE INVENTION

Figure 1:
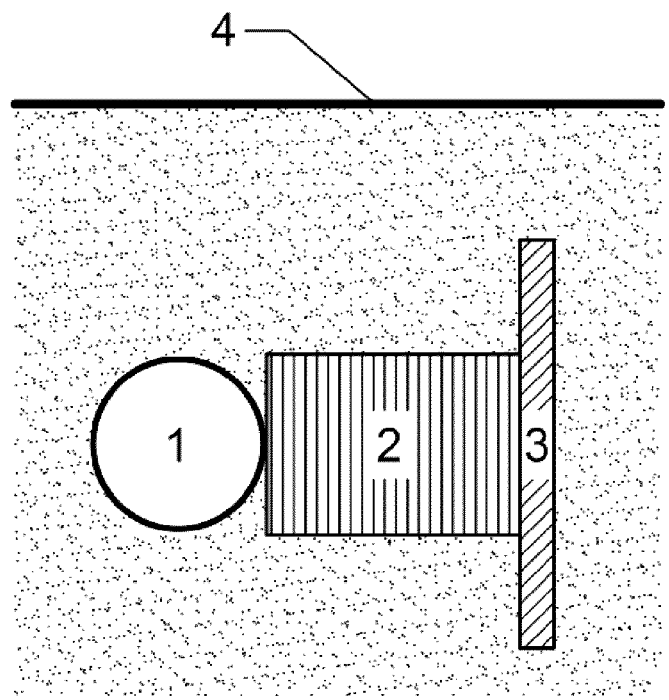
FIG. 1 is a cross sectional view of an embodiment of the invention before pipe lateral deformation wherein the elements are positioned beside the pipe.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment"

and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The system and method according to the invention modify the boundary conditions of underground pipelines in such a way that when the ground moves, the pipe is able to distribute the applied displacement in longer distances, which prevents strain concentrations and absorbs maximum displacements.

The system includes two primary elements installed near the pipe 1 in a trench before the trench is backfilled. The first element, referred to as collapser 2, is stiff in one direction to resist soil pressure and is collapsible in the other two orthogonal directions to allow the pipe 1 to move within its cross-sectional plane and along its axis. Therefore, the two sides of the collapser 2 which are not parallel to collapser 2's stiff direction are load carrying sides and the other four sides which are almost parallel to the stiff direction are collapsing sides. The second element, referred to as shield 3, is a stiff shell that extends past the load carrying sides of collapser 2 and protects collapser 2 from soil pressure.

Figure 2:
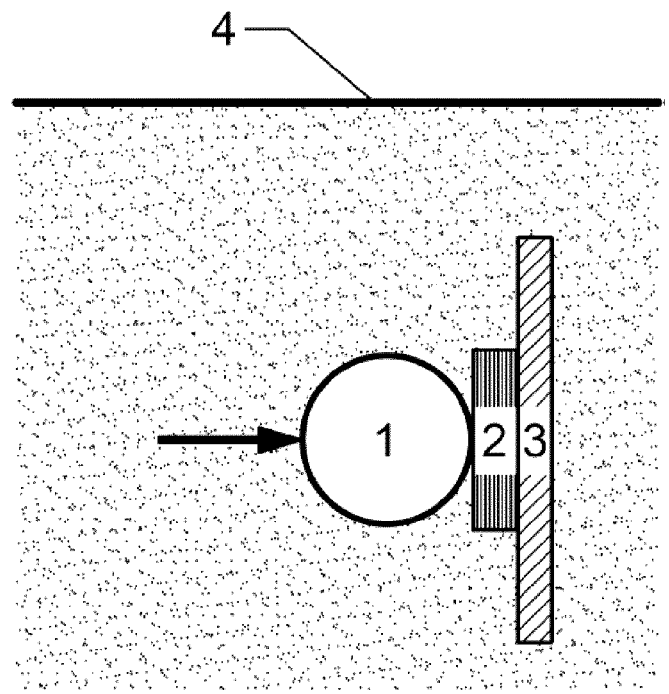
FIG. 2 is a cross sectional view of an embodiment of the invention after pipe lateral deformation wherein the elements are positioned beside the pipe.
Figure 3:
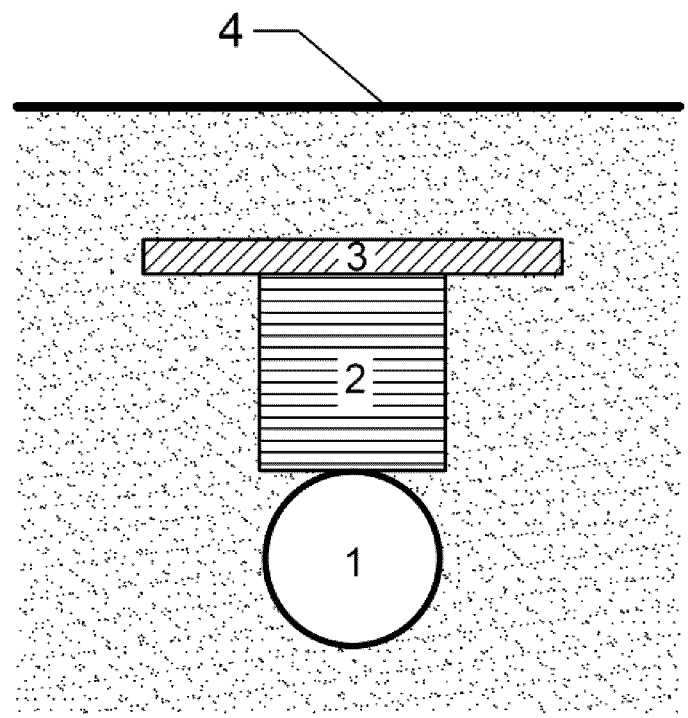
FIG. 3 is a cross sectional view of an embodiment of the invention before pipe vertical deformation wherein the elements are positioned above the pipe.
Figure 4:
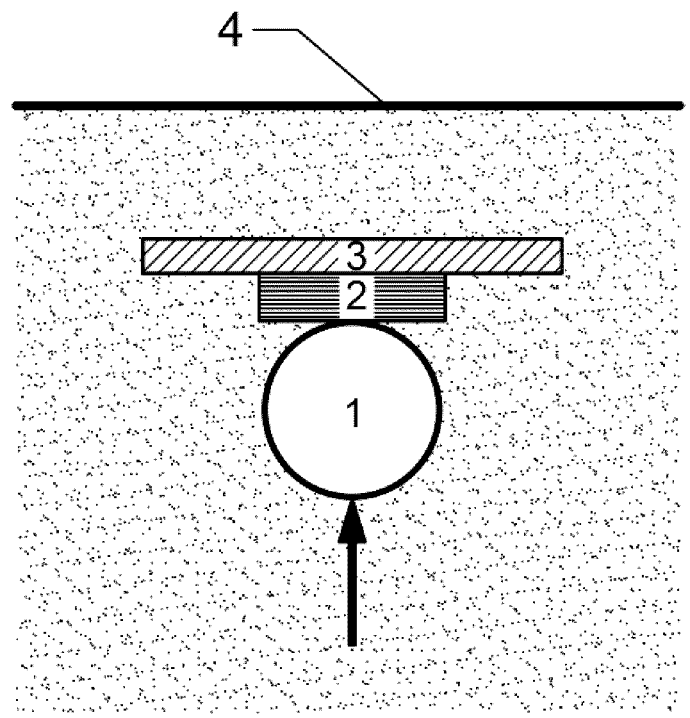
FIG. 4 is a cross sectional view of an embodiment of the invention after pipe vertical deformation wherein the elements are positioned above the pipe.

FIG. 1 and FIG. 3 show pipeline cross-sections with two arrangements of these elements installed adjacent to pipe 1. In FIG. 1, collapser 2 is positioned beside pipe 1 in such a way that its stiff direction is oriented vertically to resist the weight of backfill and overburden pressures. The horizontal distance between pipe 1 and collapser 2 is less than one pipe radius. Since collapser 2 is collapsible in the other two orthogonal directions, pipe 1 can move laterally and longitudinally without facing large resistant forces from collapser 2. In this arrangement, shield 3 protects collapser 2 from active lateral soil pressure. FIG. 2 shows the deformed shape of the system wherein collapser 2 is collapsed and pipe 1 has moved laterally towards shield 3. In FIG. 3, collapser 2 is positioned above pipe 1 in such a way that its stiff direction is oriented in the transverse direction with respect to pipe 1 axis. In this arrangement, the vertical distance between pipe 1 and collapser 2 is less than one pipe radius. Therefore, while collapser 2 resists the active lateral soil pressure on its left and right sides, it can accommodate pipe 1 vertical (upward) and longitudinal movements. In this arrangement, shield 3 protects collapser 2 from backfill weight and the overburden pressure. FIG. 4 shows the deformed shape of the system wherein collapser 2 has collapsed and pipe 1 has moved upwardly towards shield 3 and ground surface 4.

Figure 5:
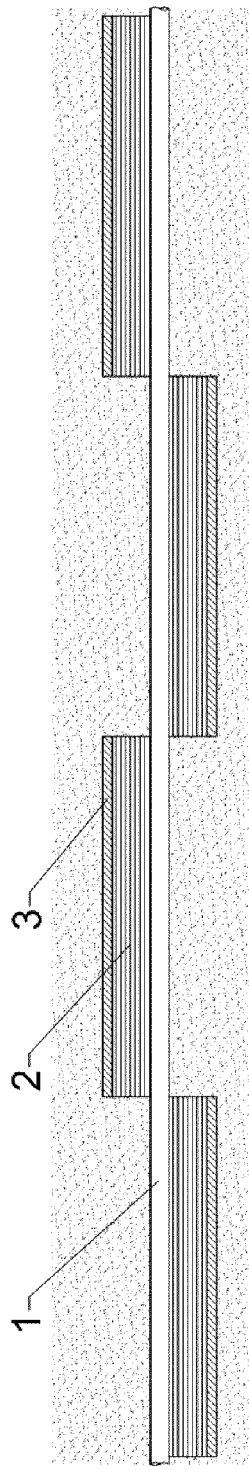
FIG. 5 is a plan view showing an embodiment of the invention suitable for areas with high risk of horizontal ground movements that cause longitudinal or lateral deformations, or a combination thereof.
Figure 6:
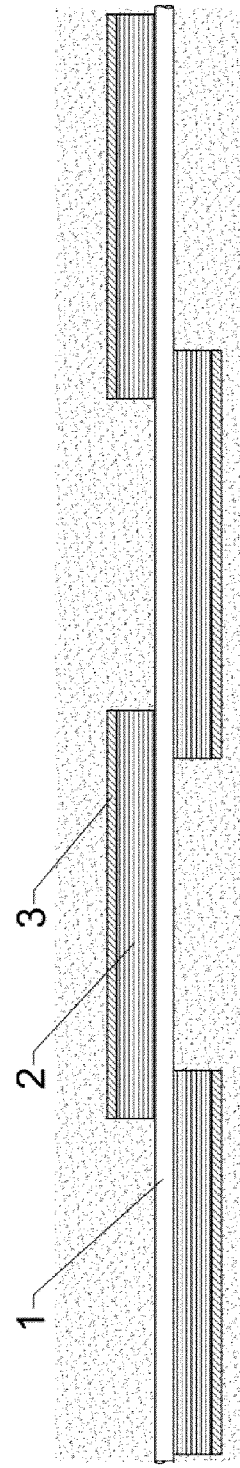
FIG. 6 is a plan view showing an embodiment of the invention wherein the installation on opposite sides of the pipe have overlaps.
Figure 7:
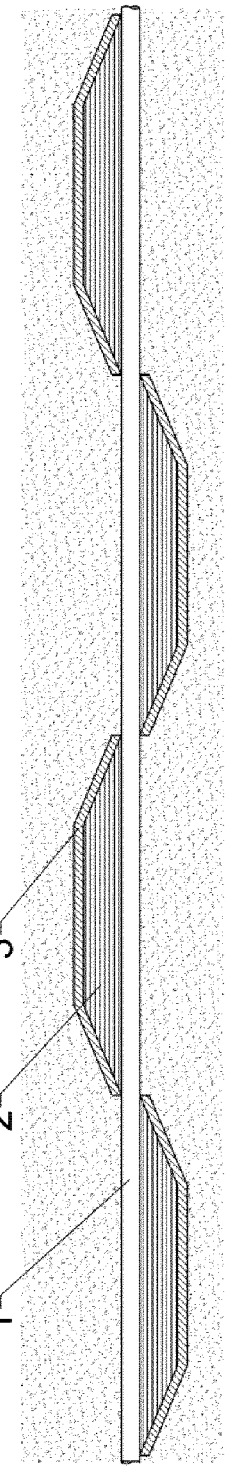
FIG. 7 is a plan view showing an embodiment of the invention wherein the width of the installation is not uniform along the pipe.

The performance of the system according to the invention under longitudinal, lateral and vertical displacements is also dependent on the arrangement of collapsers 2 and shields 3 along the pipeline. FIG. 5 shows an arrangement of these elements which is suitable for areas with high risk of horizontal (i.e. lateral and/or longitudinal) ground movements. In this arrangement, certain lengths of collapsers 2 and shields 3 are placed on alternate opposite sides of the pipe 1. In this pattern, the left and right side installations may have a certain length of overlap, depending on the expected displacement as shown in FIG. 6. The width of collapser 2 can change along the pipe as shown in FIG. 7.

Although FIG. 5 shows four pairs, or segments of collapsers 2 and shields 3, the number of segments, their size and arrangement as well as the total length of the installation may be varied and depend on the pipe and soil properties and type and magnitude of the expected ground movements.

Figure 8:
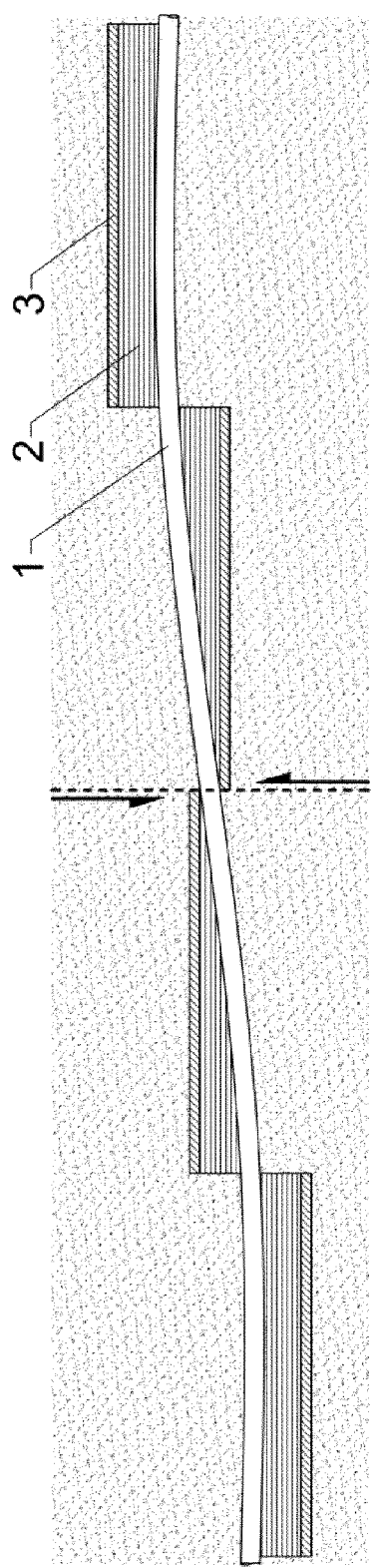
FIG. 8 is a plan view of the embodiment shown in FIG. 5 after a lateral deformation.

In the case of lateral displacements, the ability of collapser 2 to collapse within a cross-section plane of the pipeline reduces the intensity of lateral force on pipe 1. This allows pipe 1 to better distribute the displacement in a longer distance and reduces the possibility of failure under shear and bending strains. An example of an expected deformed shape for this arrangement under a lateral deformation is shown in FIG. 8.

Figure 9:
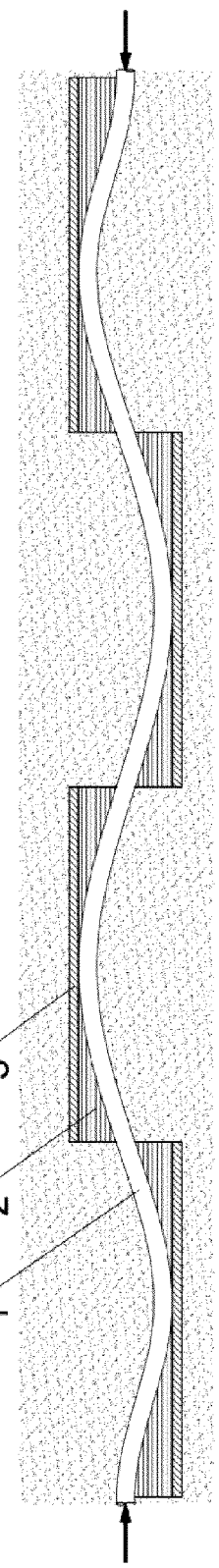
FIG. 9 is a plan view of the embodiment shown in FIG. 5 after a compressive deformation.

Longitudinal displacement results in tensile and compressive deformations. In case of compressive deformations, pipe 1 deforms in a sinusoidal shape which absorbs significantly larger compressive displacements. The expected deformed shape under compressive deformation is shown in FIG. 9. In this deformation pattern, the total displacement includes sectional and sinusoidal deformations that considerably increase pipe 1's capacity to absorb large compressive deformations.

Figure 10:
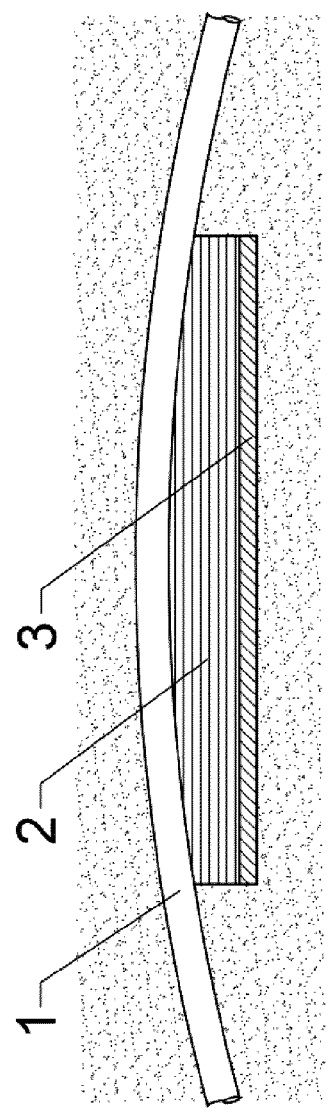
FIG. 10 is a plan view of an embodiment of the invention suitable for curved pipes in areas with high risk of horizontal ground movements that cause tensile deformations.
Figure 11:
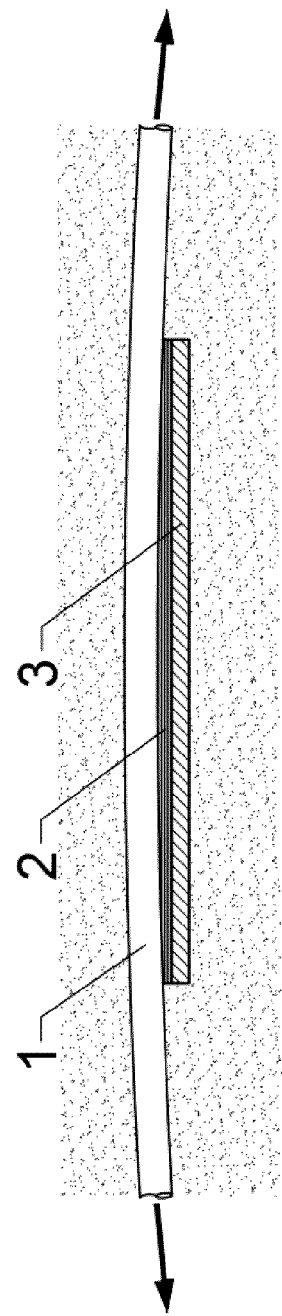
FIG. 11 is a plan view thereof after a tensile deformation in which the pipe expands via reduction of its curvature.

Continuous pipelines can distribute tensile deformations in hundreds of meters. However, this attribute becomes limited around bends and curves. The system according to the invention can also be used to increase distribution of tensile deformations for curved segments of pipelines. In these cases, the system can be installed on the inside of the inner curved line of pipe 1. When pipe 1 goes through tensile deformations, pipe 1 laterally moves towards the elements and expands via reduction of its curvature. This arrangement of elements and the deformed shapes after tensile deformations are shown in FIG. 10, and FIG. 11, respectively. This element arrangement can also be used for segmented pipelines which are also vulnerable to tensile deformations.

Figure 12:
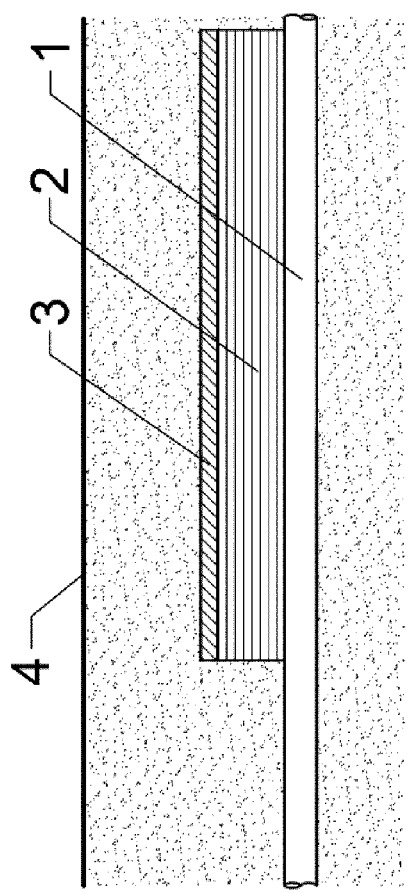
FIG. 12 is a profile view of an embodiment of the invention suitable for areas with high risk of vertical ground movements.
Figure 13:
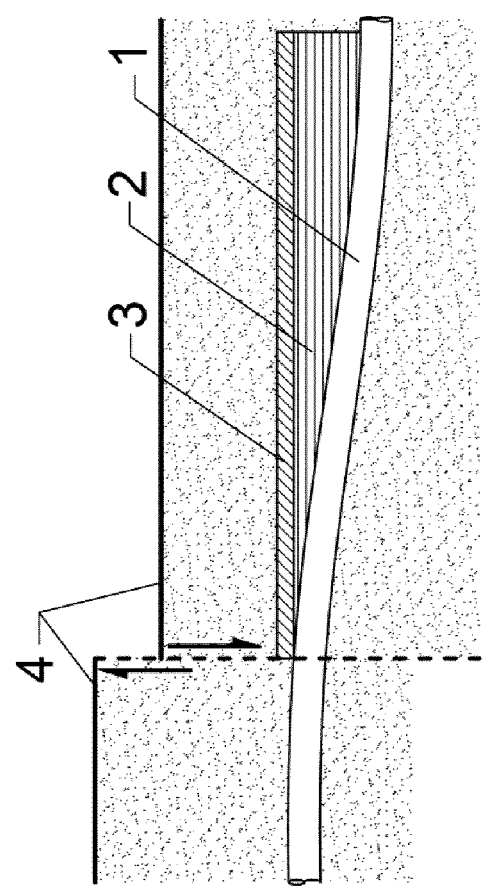
FIG. 13 is a profile view thereof after a vertical deformation.

For areas susceptible to vertical ground movements the elements are positioned on top of pipe 1 as shown in FIG. 12. This arrangement allows pipe 1 to distribute vertical displacements in a long length of the pipe 1 and consequently reduce strain concentrations. The deformed pipe 1 shape after vertical deformation is shown in FIG. 13. In this arrangement, the soil directly located under both ends of shield 3 and next to collapser 2 can be locally reinforced by an appropriate geotechnical soil reinforcement method such as geo-grid. This stabilizes the soil supporting shield 3 and reduces the active soil pressure on collapser 2.

It is the function rather than the composition of collapser 2 and shields 3 that is important. A variety of material types and structural configurations can be employed to build collapser 2 and shield 3 while maintaining their functionality. For example, collapser 2 can include foldable plastic or FRP (fiber-reinforced plastic) boxes made of stiff walls interconnected by flexible hinge-lines along their heights. The walls thus resist loads along their heights and are collapsible in the other two orthogonal directions by rotating around the soft hinges. Another example for collapser 2 can also include an array of thin-walled plastic cylinders or right-prisms with square or hexagonal cross sections. These cylinders or prisms provide high stiffness along their axis and low stiffness in their radial direction. Therefore, a collapser 2 made of an array of these individual components will be stiff in one direction and collapsible in other two orthogonal directions. Shield 3 acts similar to a wall or slab and can be made of variety of material and structural configurations with desired material properties. For example shield 3 can include treated wood panels, or corrugated steel panels or thick corrugated FRP panels, or precast concrete panels.

In an embodiment of the invention, pipe 1 is configured to slide, which results in a better distribution of deformation among a long portion of the pipeline, especially when compression is involved. This can be achieved by various means, including any of the following: using backfill material that has low pipe-soil friction coefficient; applying pipe coatings to reduce soil-pipe friction; minimizing the friction between collapser 2 and pipe 1; and/or minimizing the friction between shield 3 and collapser 2. In order to minimize the friction between pipe 1, collapser 2 and shield 3, a sliding surface with low friction coefficient may be positioned between pipe 1 and collapser 2 or between collapser 2 and shield 3 to facilitate sliding of pipe 1. Alternatively, collapser 2 could contain a fluid releasable after pipe 1 compresses against collapser 2 to facilitate movement of pipe 1 under the ground.

Figure 14:
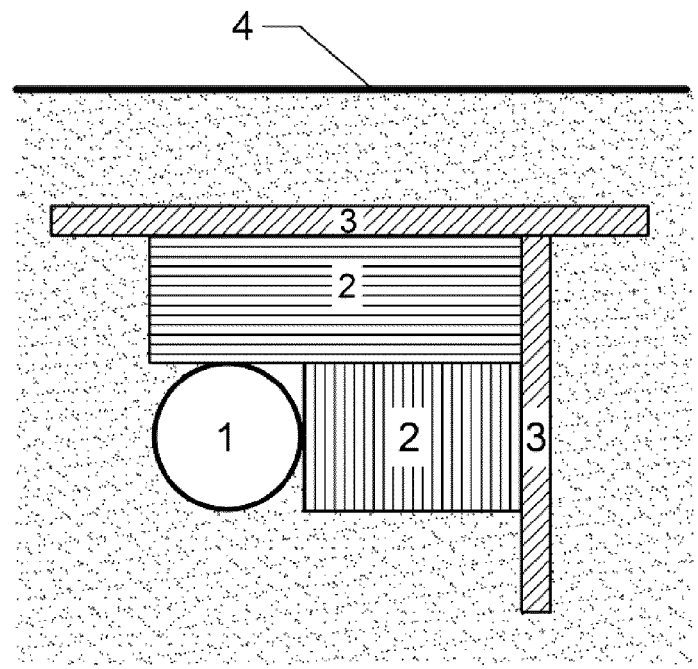
FIG. 14 is a cross sectional view of an embodiment of the invention wherein the elements are positioned beside and above the pipe.
Figure 15:
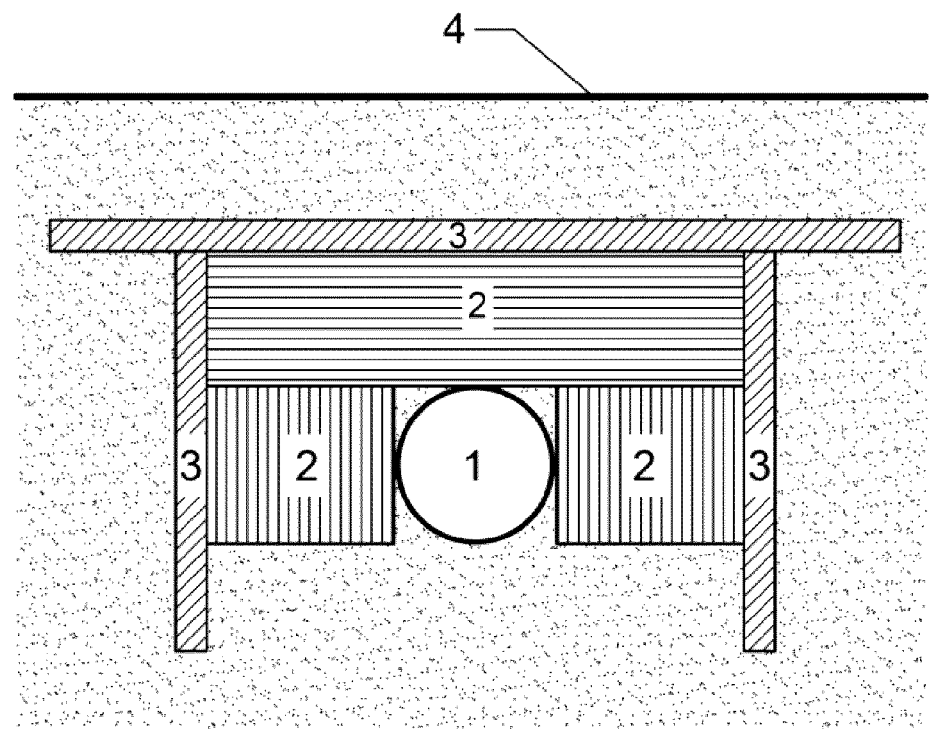
FIG. 15 is a cross sectional view of an embodiment of the invention wherein the elements are positioned on both sides and above the pipe.

The basic components of ground movements (i.e. longitudinal, transverse and vertical) are illustrated separately to better show the system performance. However, pipeline displacements due to ground movements in the field are usually a combination of these basic components. Optimum installation arrangements can be designed based on the magnitude of each basic component in the expected displacement. The optimum installation arrangement can be similar to one of the embodiments illustrated in FIG. 1 to FIG. 13 or a combination of such embodiments. For example, FIG. 14 shows a pipeline cross-section wherein collapsers 2 and shields 3 are installed both beside and above pipe 1. FIG. 15 shows a pipeline cross-section wherein collapsers 2 and shields 3 are installed on both sides and above pipe 1. These arrangements are suitable for areas with lateral, vertical and longitudinal ground movements.

Several factors affect the design of the system including pipeline properties (geometrical, material and operational), backfill properties, surrounding soil and environmental conditions, and type/magnitude of expected displacements. Based on these inputs, a design process should identify: structure, size and material for collapser 2 and shield 3 elements; effective installation arrangement of the system including length, overlap, intervals, and the total length of the installation; and the need for additional measures or secondary elements to facilitate pipe 1's longitudinal slide. The design process provides that the deformation only triggers under the expected ground movement and not operational loads.

The probability of pipeline displacements (with different patterns and magnitudes) and consequence of failure varies among different projects and along each pipeline. Potential ground movement can be identified through geo-hazard risk assessment of the pipeline route. The consequence of pipeline failure can be evaluated based on pipe size, operating pressure and type of transported fluid as well as environmental and demographic risk tolerances. Early prospective application of the invention will be in areas with both high probability and high consequence of failure. Consequently, and with optimizing the manufacturing and installation process and associated costs, the system according to the invention can be used in areas with moderate or greater probability and/or consequence of failure which significantly increases the reliability of the pipeline.

The system should be configured to differentiate between ground movements from re-occurring or seasonal sources (e.g. permafrost heave and thaw settlements) and ground movements due to low frequency Force-Majeure incidents (e.g. land slide or earthquake). The system designed for seasonal phenomena should have a resilient structure to recover its original state and let pipe 1 rebound with ground movement retrieval. However, it is not practical to design a system that is able to rebound after each low frequency Force-Majeure incident. In these circumstances, the system goes through its predefined deformation to absorb imposed displacements safely and subsequently, the deformed portion can be recovered or replaced if required. The predefined deformation pattern and knowledge of the locations of the installation make it easy to locate the deformed portion by available monitoring systems.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. A system to increase the deformability of a pipe buried in soil comprising:
   a. a first near element positioned close to a first side of the pipe, the first near element having first and second opposite stiff load carrying sides and having first and second opposite collapsible sides; and
   b. a first distant element positioned next to the first near element, the first distant element extending past the first and second stiff load carrying opposite sides;
   wherein the first near element is positioned between the pipe and the first distant element with the first collapsible side positioned close to the first side of the pipe, and the first near element is collapsible such that in a cross-section of the pipe, the pipe is moveable in a direction towards the first near element and the first near element is configured to carry soil pressure perpendicular to the pipe movement direction and wherein the first distant element protects the first near element from soil pressures.

2. The system of claim 1 further comprising a second near element and a second distant element, wherein the first and second near elements are positioned on opposite sides of the pipe and each of the first and second near elements is protected from the soil pressure by respective first and second distant elements.

3. The system of claim 1 further comprising a second distant element, wherein the first and second distant elements are positioned on opposite sides of the pipe approximately parallel to each other.

4. The system of claim 1 wherein the first near element is oriented vertically and is collapsible in a lateral direction with respect to the pipe axis thereby allowing the pipe to move laterally without developing forces large enough to damage the pipe.

5. The system of claim 4 wherein the height of the first near element is at least equal to the pipe diameter.

6. The system of claim 1 further comprising a plurality of pairs of near elements and distant elements, wherein each pair is positioned along the pipe and alternating between opposing sides of the pipe with an overlap on opposing sides of the pipe.

7. The system of claim 1 further comprising a plurality of pairs of near elements and distant elements, wherein each pair is positioned along the pipe and alternating between opposing sides of the pipe without an overlap on opposing sides of the pipe.

8. The system of claim 1 wherein the first near element is oriented horizontally and is collapsible in a vertical direction with respect to the pipe axis thereby allowing the pipe to move vertically without developing forces large enough to damage the pipe.

9. The system of claim 8 wherein the width of the first near element is at least equal to the pipe diameter.

10. The system of claim 1 further comprising a plurality of near elements and distant elements positioned on top of the pipe and along the length of the pipe.

11. The system of claim 1 wherein the size, material and structure of the first near element and the first distant element are selected based on soil mechanical properties, characteristics of the pipe and expected type and magnitude of ground movements.

12. The system of claim 1 wherein the first near element contains a fluid releasable after the pipe contacts the first near element to facilitate movement of the pipe.

13. The system of claim 1 wherein a sliding surface is positioned between the pipe and the first near element to decrease friction between the pipe and the first near element and facilitate longitudinal sliding of the pipe.

14. The system of claim 1 wherein a sliding surface is positioned between the first near element and the first distant element to decrease friction between the first near element and the first distant element and facilitate longitudinal sliding of the pipe.

15. The system of claim 1 further comprising backfill around the pipe, wherein the backfill is configured to provide friction between the pipe and soil to maintain the integrity of the pipe under operating conditions and to facilitate the desired deformation of the pipe under expected ground movement.

16. The system of claim 1 wherein the first near element and the first distant element are installable after removal of backfill on the pipe.

17. The system of claim 1 wherein the dimensions and installation angle of the first near element and first distant element varies along the pipe.

18. A method of directing the deformation of a buried pipe in at least two orthogonal directions, comprising:
   a. providing a first near element positioned close to a first side of the pipe, the first near element having first and second opposite stiff load carrying sides and having first and second opposite collapsible sides; and
   b. providing a first distant element positioned next to the first near element, the first distant element extending past the first and second stiff load carrying opposite sides;
   wherein the first near element is positioned between the pipe and the first distant element with the first collapsible side positioned close to the first side of the pipe, and the first near element is collapsible such that in a cross-section of the pipe, the pipe is moveable in a direction towards the first near element and the first near element is configured to carry soil pressure perpendicular to the pipe movement direction and wherein the first distant element protects the first near element from soil pressure.

* * * * *